(12) United States Patent
Timpe et al.

(10) Patent No.: US 7,553,475 B2
(45) Date of Patent: Jun. 30, 2009

(54) PROCESS FOR PRODUCING HIGH-PRESSURE HYDROGEN

(75) Inventors: Ronald C. Timpe, Grand Forks, ND (US); Ted R. Aulich, Grand Forks, ND (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 605 days.

(21) Appl. No.: 10/553,531

(22) PCT Filed: Apr. 15, 2004

(86) PCT No.: PCT/US2004/011576

§ 371 (c)(1),
(2), (4) Date: Oct. 14, 2005

(87) PCT Pub. No.: WO2004/103894

PCT Pub. Date: Dec. 2, 2004

(65) Prior Publication Data

US 2006/0225348 A1   Oct. 12, 2006

Related U.S. Application Data

(60) Provisional application No. 60/463,465, filed on Apr. 16, 2003.

(51) Int. Cl.
*C01B 3/02* (2006.01)
*C01B 3/04* (2006.01)
*C01B 3/24* (2006.01)
*C01B 3/26* (2006.01)

(52) U.S. Cl. .................. 423/648.1; 423/652; 423/653; 423/654

(58) Field of Classification Search ................. 423/650, 423/651, 652, 648.1, 653, 654
See application file for complete search history.

(56) References Cited

U.S. PATENT DOCUMENTS

| | | | |
|---|---|---|---|
| 4,372,755 A | 2/1983 | Tolman et al. |
| 4,485,003 A | 11/1984 | Coenen et al. |
| 4,946,667 A | 8/1990 | Beshty |
| 4,986,978 A | 1/1991 | Dupont et al. |
| 5,093,102 A | 3/1992 | Durand et al. |
| 5,280,701 A | 1/1994 | Tolman |
| 5,339,621 A | 8/1994 | Tolman |
| 5,912,424 A | 6/1999 | Judkins et al. |
| 5,972,077 A | 10/1999 | Judkins et al. |

(Continued)

FOREIGN PATENT DOCUMENTS

EP        0303438        *    2/1989

(Continued)

*Primary Examiner*—Wayne Langel
(74) *Attorney, Agent, or Firm*—Johnson & Associates

(57) ABSTRACT

A method and apparatus for use in producing high-pressure hydrogen from natural gas, methanol, ethanol, or other fossil fuel-derived and renewable hydrocarbon resources. The process can produce hydrogen at pressure ranging from 2000 to 12,000 pounds per square inch (psi) using a hydrogen feedstock (16, 18) high pressure water (12, 18), and an appropriate catalyst. Following making and heating in preheater (14), the catalyst reacts with the hydrogen feedstock (16, 18) and high pressure water (12, 18) in a catalytic reformer (20) maintained under desired temperature and pressure conditions. Reformate products exit reformer (200) and flow into condenser (22), in which water and a portion of the carbon dioxide product are condensed.

19 Claims, 4 Drawing Sheets

U.S. PATENT DOCUMENTS

| | | |
|---|---|---|
| 6,001,256 A | 12/1999 | Hawthorne et al. |
| 6,083,409 A | 7/2000 | Lin et al. |
| 6,267,912 B1 * | 7/2001 | Hershkowitz et al. ....... 252/373 |
| 6,284,157 B1 * | 9/2001 | Eliasson et al. ............. 252/373 |
| 6,312,658 B1 * | 11/2001 | Hufton et al. ............ 423/418.2 |
| 6,352,644 B1 | 3/2002 | Hawthorne et al. |
| 6,447,745 B1 * | 9/2002 | Feeley et al. ............. 423/648.1 |
| 6,504,068 B1 | 1/2003 | Matsurbara et al. |
| 6,589,303 B1 * | 7/2003 | Lokhandwala et al. . 48/197 FM |

FOREIGN PATENT DOCUMENTS

| | | |
|---|---|---|
| WO | WO 92/00241 | 1/1992 |

* cited by examiner

FIG. 4

High-Pressure Hydrogen from Natural Gas—Product Gas Composition

| Sample | Continuous 1 | Batch 1 | Batch 2 | Batch 3 |
|---|---|---|---|---|
| Hydrogen, mol% | 19.3 | 19.9 | 16.9 | 16.4 |
| Carbon Dioxide, mol% | 7.6 | 8.6 | 5.1 | 6.3 |
| Methane, mol% | 72.6 | 70.1 | 76.6 | 75.7 |
| Ethane, mol% | 0.4 | 1.1 | 1.2 | 1.4 |
| Propane, mol% | 0.0 | 0.3 | 0.0 | 0.1 |
| cis-2-Butene, mol% | 0.0 | 0.0 | 0.0 | 0.0 |
| Carbon Monoxide, mol%* | 0.0 | 0.0 | 0.0 | 0.0 |

* Analytical detection limit for carbon monoxide was 100 ppm.

FIG. 5

High-Pressure Hydrogen from Methanol—Product Gas Composition

| Sample | Continuous 1 | Continuous 2 | Batch 1 | Batch 2 |
|---|---|---|---|---|
| Hydrogen, mol% | 65.1 | 66.4 | 72.4 | 69.7 |
| Carbon Dioxide, mol% | 23.9 | 23.8 | 16.8 | 17.1 |
| Methane, mol% | 6.5 | 5.4 | 4.9 | 7.6 |
| Ethane, mol% | 0.1 | 0.1 | 0.1 | 0.0 |
| Propane, mol% | 0.0 | 0.0 | 0.0 | 0.0 |
| cis-2-Butene, mol% | 0.1 | 0.1 | 0.5 | 0.4 |
| Carbon Monoxide, mol% | 4.3 | 4.2 | 5.4 | 5.2 |

PROCESS FOR PRODUCING HIGH-PRESSURE HYDROGEN

CROSS REFERENCE TO RELATED APPLICATIONS

This application is a U.S. national stage application of co-pending commonly owned PCT application Ser. No. PCT/US04/11576, filed on Jun. 15, 2003, entitled "SYSTEM AND PROCESS FOR PRODUCING HIGH-PRESSURE HYDROGEN," which claims priority to U.S. provisional patent application Ser. No. 60/463,465, filed on Apr. 16, 2003, entitled "PROCESS FOR PRODUCING HIGH-PRESSURE HYDROGEN," both of which are incorporated by reference herein.

This invention relates to the field of hydrogen production. In particular, this invention is drawn to a system and method of producing high pressure hydrogen on demand, using a catalytic reformer under high pressure conditions.

BACKGROUND OF THE INVENTION

There are numerous proposals to transition from the current fossil fuel-based transportation systems to what is known as the "hydrogen economy." A hydrogen economy would use vehicles powered by fuel cells, or hydrogen burning internal combustion engines, in place of gasoline or diesel powered vehicles. However, there are several problems which must be overcome to make a hydrogen economy economically and technically feasible. One problem is a lack of an economically viable means of supplying fuel cell-quality hydrogen. Typical fuel cells require relatively pure form of hydrogen, which makes the hydrogen production more difficult and costly. Another problem relates to hydrogen storage and transportation. To make a hydrogen-powered vehicle practical, hydrogen is stored in one or more tanks under high pressure. Because of its small molecular size, hydrogen is much more difficult and expensive to compress than natural gas, for example. Typical prior art hydrogen production techniques require the costly step of pressurizing the hydrogen after it is produced.

When supplying a hydrogen-powered vehicle with fuel, there are two basic options. A first supply option is on-board vehicle extraction of hydrogen from hydrocarbon fuels. A second option is on-board vehicle storage of hydrogen produced and dispensed at a stationary facility. Within these two basic options, numerous specific variations are being studied and/or developed, including, but not limited to 1) on-board vehicle extraction of hydrogen from gasoline, diesel fuel, naphtha, and methanol; 2) fuel station site hydrogen production via steam methane (natural gas) reforming (SMR) or other hydrocarbon-based processes; 3) fuel station site hydrogen production via electrolysis of water; 4) centrally produced (via large-scale SMR, electrolysis, and other processes) hydrogen delivered to a fuel station by truck or pipeline; and 5) other supply scenarios involving hydrogen production via photochemical, gasification, nuclear, biomass-based, biological, and solar-powered, wind-powered, and hydro-powered methods.

SMR is the most common and least expensive prior art method of hydrogen production, accounting for about 95% of the hydrogen produced in the United States. In SMR, methane is reacted with steam to produce a mixture of hydrogen, carbon dioxide, carbon monoxide, and water, and the mixture is separated to yield high-purity hydrogen. Because of its status as a mature, reliable, economically viable technology, major industrial companies are developing hydrogen vehicle refueling station concepts based on the use of on-site SMR. These concepts involve scaling the process down significantly from its most common commercial application of producing hydrogen at petroleum refineries for use in making cleaner-burning gasoline. Challenges associated with on-site hydrogen generation derive from the unpredictable demands of vehicle fueling. Because SMR works best at a steady-state, 24 hours per day, full capacity operation, integration with a hydrogen fuel station will require costly on-site hydrogen compression and storage (as a gas, a liquid, or in a chemical compound) to compensate for fluctuating hydrogen demand. None of the hydrogen storage technologies available today represent an ideal combination of economy, performance, durability, and safety.

There are various prior art methods of producing a useful gas, or for generating gases from the process of breaking down waste products. For example, as mentioned above, SMR is the most common prior art method of producing hydrogen. Typically, SMR is performed at temperatures in the range of 700°-1000° C., and at pressures in the range of 30-735 psi. Processes that require a high temperature are less desirable since more energy is expended during the process. Similarly, typical prior art processes that produce hydrogen have the disadvantage of requiring pressurization after the hydrogen is produced, since vehicle fuel-hydrogen must be compressed to enable sufficient fuel for a desirable range (e.g., 300 miles).

It can be seen that there is a need for techniques for producing hydrogen on-demand in an economical manner. There is also a need for techniques that produce hydrogen at high pressures, reducing or eliminating the need for the costly step of pressurizing hydrogen after it is produced.

SUMMARY OF THE INVENTION

An apparatus and method is provided for producing high pressure hydrogen on-demand. The invention uses a mixture of hydrocarbon feedstock and high pressure water exposed to a catalyst under high pressure conditions to produce high-pressure hydrogen. In one embodiment, carbon dioxide that is produced can be separated and recovered for sequestration or other utilization options. In another example, the apparatus can be integrated with a fuel cell to provide hydrogen to the fuel cell, while the fuel cell provides heat to help maintain desired conditions in the hydrogen production reactor.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 4 is a table presenting compositional data on four different product gas samples collected during a series of tests utilizing natural gas as the hydrogen carrier.

FIG. 5 is a table presenting compositional data on four different product gas samples collected during a series of tests utilizing methanol as the hydrogen carrier.

DETAILED DESCRIPTION

Figure 1:
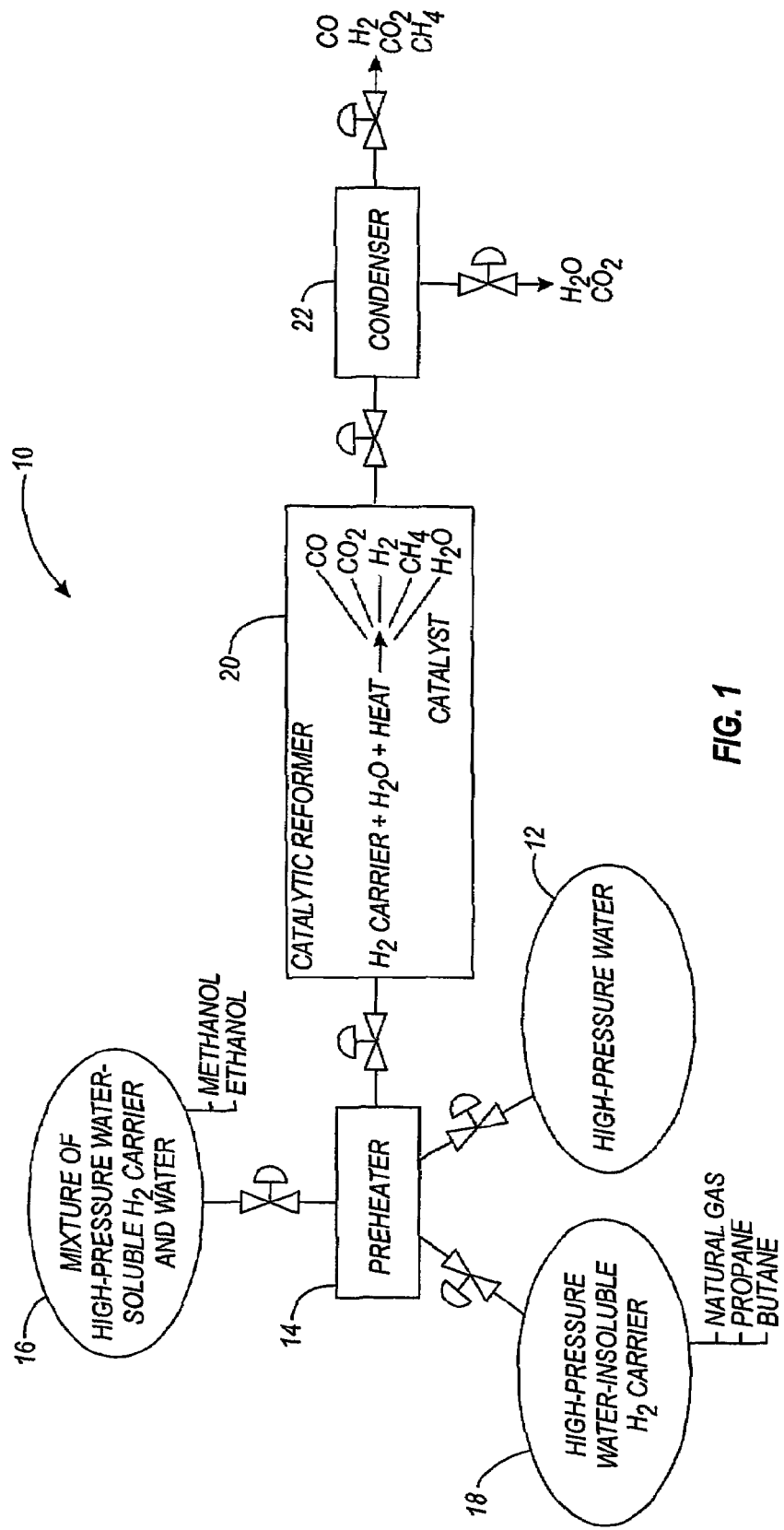
FIG. 1 is a schematic diagram of a reactor system 10 which may be used with the present invention.

Generally, the present invention offers an apparatus and method of economically producing high-pressure hydrogen, thereby eliminating the need for expensive hydrogen compression. In addition, the present invention can be used for on-demand production of high-pressure hydrogen, which results in greatly diminished hydrogen storage volume requirements compared to prior art systems, such as SMR and other demand-unresponsive processes. The present invention can produce high-pressure hydrogen from natural gas, methanol, ethanol, and other fossil fuel-derived and renewable hydrocarbon resources, including oxygen- and nitrogen-containing hydrocarbons. The process can produce hydrogen at pressures ranging from 2000 to 12,000 pounds per square inch (psi) using a hydrogen carrier, water, and a catalyst under high pressure, moderate temperature reaction conditions. Note that this pressure range is only one example, and that higher pressures could also be used. In one example, when using either natural gas or methanol as the hydrogen carrier, the process described below yields gaseous products with hydrogen concentrations of up to 19 mole percent (mol %) and 66 mol %, respectively. Note that neither of these concentrations are meant to be the limit expected under optimal conditions. With methanol as a hydrogen source, non-hydrogen product gas constituents may include carbon dioxide, carbon monoxide, methane, ethane, and nitrogen. With methane as hydrogen source, non-hydrogen product gas constituents may include methane, nitrogen, oxygen, ethane, and no detectable carbon monoxide.

The production of hydrogen ($H_2$) using the present invention is based on the reactions between hydrocarbons such as in the following examples:

$$CH_4 + 2 H_2O \rightarrow 4 H_2 + CO_2$$

$$CH_3OH + H_2O \rightarrow 3 H_2 + CO_2$$

$$C2H5OH + 3 H_2O \rightarrow 6 H_2 + 2 CO_2$$

In the practice described below, the hydrocarbon is fed into the system at high pressure and is heated prior to and while contacting a catalyst to produce hydrogen gas, all the while maintaining high pressure. The gas stream exits the reactor where excess water and $CO_2$ are condensed and removed to yield a purer hydrogen product.

The present invention has many uses. One application of the invention is for on-demand production of high-pressure hydrogen for fuel cells, including proton exchange membrane (PEM) fuel cells used for powering transportation vehicles, as well as PEM and other fuel cells used for other mobile and stationary power production purposes. Utilizing the invention for PEM fuel cell applications may require integration with a hydrogen purification technology, since PEM fuel cells require low-contaminant-level hydrogen for trouble-free operation and maximum power density. Examples of a hydrogen purification technology that may be used are described in U.S. Pat. No. 5,912,424, issued on Jun. 15, 1999, entitled "Electrical Swing Adsorption Gas Storage and Delivery System" and U.S. Pat. No. 5,972,077, issued on Oct. 26, 1999, entitled "Gas Separation Device Based on Electrical Swing Adsorption", both of which are incorporated herein by reference. When integrated with a hydrogen purification technology, the invention holds significant advantages over other technologies being pursued for producing hydrogen for fuel cell vehicles. One advantage is the elimination of the need for expensive hydrogen compression. Another advantage is a significant reduction of the need for expensive storage of high-pressure hydrogen. Following is a more detailed description of the invention. The present invention can also be used to fill hydrogen cylinders or tanks for various uses.

The present invention is similar to SMR in that both processes can involve the use of natural gas as a hydrogen carrier, water as a reactant, and a catalyst to promote methane reforming to hydrogen and carbon dioxide. However, there are several distinctions between the two processes. One distinction is the temperature and pressure ranges utilized in the reforming reaction. In the present invention, the reactor is maintained within temperature and pressure ranges of approximately 375°-640° C. and 2000-12,000 psi, respectively. In contrast, SMR utilizes reaction temperatures and pressures ranging from about 700°-1000° C. and 30-735 psi, respectively. Another distinction is that the present invention can be utilized with hydrogen carriers other than natural gas/methane, including—but not limited to—propane, butane, methanol, and ethanol.

FIG. 1 shows one example of an apparatus and method of the present invention. FIG. 1 is a schematic diagram of a reactor system 10 which may be used with the present invention. As outlined in FIG. 1, the reactor system 10 can be configured to extract hydrogen from a liquid or gaseous, water-soluble or water-insoluble hydrogen carrier. Note that other variations are also possible within the scope of the present invention. FIG. 1 shows a source of high-pressure water 12 connected to a preheater 14 via a control valve. In one example, the high-pressure water is pressurized to a pressure of approximately 2,000 to 12,000 psi. At least one hydrogen carrier is also connected to the preheater 14. FIG. 1 shows two hydrogen carrier sources. A first hydrogen carrier source 16 is illustrated for water soluble hydrogen carriers. The hydrogen carrier source 16 supplies a mixture of high pressure water soluble hydrogen carrier and water to the preheater 14 via a control valve. In one example, this mixture is pressurized to a pressure of approximately 2000 to 12,000 psi. Examples of water soluble hydrogen carriers include methanol and ethanol. A second hydrogen carrier source 18 is illustrated for hydrogen carriers that are water insoluble under temperature and pressure conditions below the critical point of water. The hydrogen carrier source 18 supplies a high pressure water insoluble hydrogen carrier to the preheater 14 via a control valve. In one example, this mixture is pressurized to a pressure of approximately 2,000 to 12,000 psi. Examples of water insoluble hydrogen carriers include natural gas, propane, and butane. Note that while FIG. 1 illustrates two possible hydrogen carrier sources, the system shown in FIG. 1 needs only one hydrogen carrier source. The hydrogen carrier sources shown in FIG. 1 can take any desired form. In one example, a hydrogen carrier source can be a storage tank. In another example, the hydrogen carrier source can come from a pipeline or other fuel supply.

The preheater 14 is connected to a catalytic reformer 20 via a control valve. After the preheater 14 heats a mixture of high-pressure hydrogen feedstock and water, the control valve is opened, allowing the mixture flow into the catalytic reformer 20, which also contains a catalyst. The catalytic reformer 20 can comprise a tubular reactor capable of high pressure, moderate temperature operation in the presence of gas with a high content of molecular hydrogen. For example, the reformer used in the process development work described below comprised a thick-walled tubular reactor fabricated from 316 stainless steel, equipped with high pressure manually operated valves. The catalytic reformer 20 is connected to a condenser 22 via a control valve. The reaction that takes place in the catalytic reformer 20 (described below) results in a number of product gases, depending on the hydrogen feedstock and catalyst used. These product gases flow into the condenser, which separates the product gases, including high-pressure hydrogen. The hydrogen content of the product gas stream is increased by utilizing CO and water to produce hydrogen via the water-gas shift reaction.

The system shown in FIG. 1 can be operated in various ways. Following are some examples. When utilizing natural gas or another water-insoluble hydrogen carrier (e.g., hydrogen carrier source 18 in FIG. 1), high-pressure water and the natural gas or other water-insoluble hydrogen carrier are separately injected into the preheater 14 at a desired water-to-hydrogen carrier molar ratio. Tests conducted to date have utilized water-to-hydrogen carrier molar ratios ranging from 0.1:1 to 4:1. In general, for water-based reforming of any hydrogen carrier, utilization of a water-to-hydrogen carrier molar ratio of at least 1:1 ensures availability of sufficient oxygen to guard against undesired carbon build-up on catalyst used to promote the reforming reaction. However, minimal usage of high pressure water is desirable to minimize process energy input, and lower water-to-hydrogen carrier molar ratios may be achievable with improved reforming catalysts. Following mixing and heating in the preheater 14, the reactant mixture flows into the reformer 20, which, in one example, comprises a tubular reactor containing a commercially available reforming catalyst. The process is compatible with continuous-flow operation, and residence time in the reformer is a function of pressure and flow rate through the reformer. The residence time in the reformer using the present invention may be in the range of 0.5 to 360 seconds, in one example.

Figure 2:
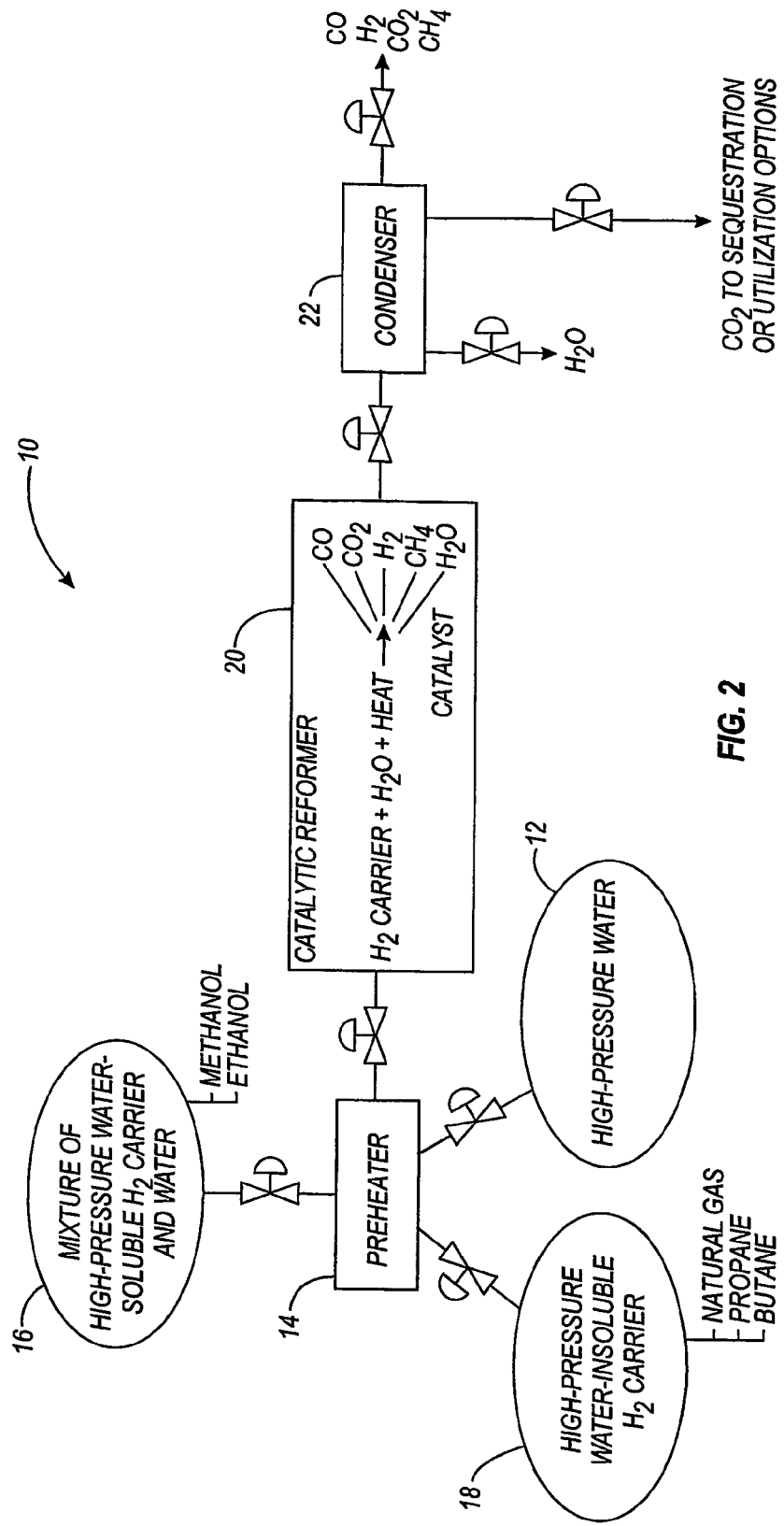
FIG. 2 is a schematic diagram of a reactor system showing $CO_2$ separation and recovery.

Reformate products (e.g., CO, $CO_2$, $H_2$, $CH_4$, $H_2O$) exit the reformer 20 and flow into the condenser 22, in which water and a portion of the carbon dioxide product are condensed. Pressure in the condenser and pressure of the product gas stream exiting the condenser 22 can be maintained at or near pressure in the reformer (or lower, if desired) by adjustment of the control valve at the condenser exit. The product gases exiting the condenser 22 (e.g., CO, $H_2$, $CO_2$, $CH_4$) can be used directly, depending on the concentrations of the product gases, and depending on the application. For some applications (including solid oxide fuel cells), it may be desirable to feed the product gas mixture directly. Other applications may require treating the product gas stream with a hydrogen purification technology, such as mentioned above. Also, the $CO_2$ gas can be recovered for sequestration or other utilization option. FIG. 2 is a schematic diagram of a reactor system 10 similar to that shown in FIG. 1, except that the $CO_2$ gas is shown to be separated and recovered for sequestration or other utilization option.

When utilizing methanol or another water-soluble hydrogen carrier (e.g., hydrogen carrier source 16 in FIG. 1), a mixture of methanol (or other water-insoluble hydrogen carrier) and water is pressurized and injected into the preheater 14 at a desired water-to-hydrogen carrier molar ratio. From the preheater 14 on downstream through the reactor system, the process steps and conditions are the same to those utilized for natural gas (described above).

Figure 3:
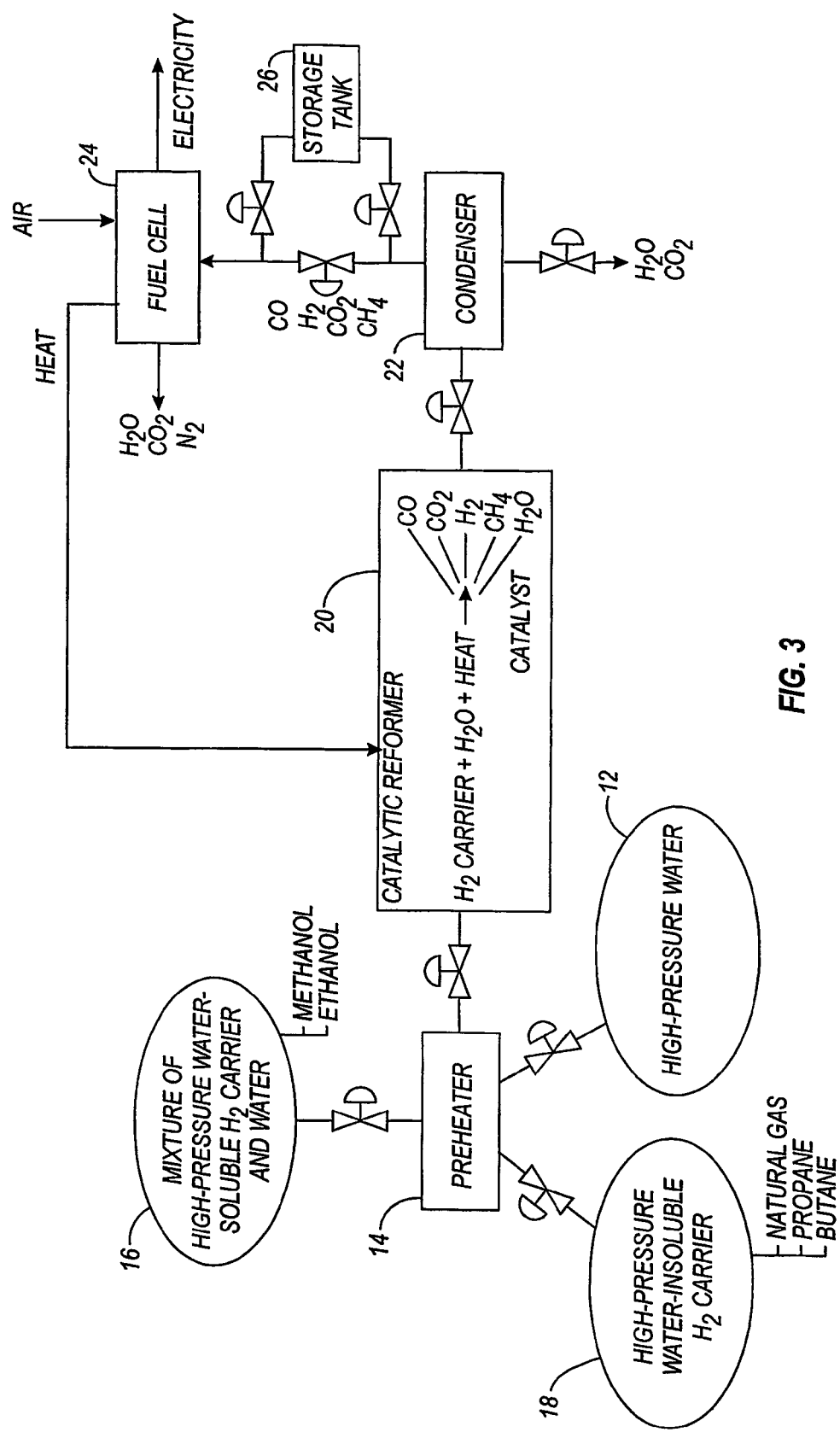
FIG. 3 is a schematic diagram of a reactor system coupled integrated with a fuel cell.

One use of the present invention is to provide fuel to a fuel cell. FIG. 3 is a schematic diagram of a reactor system similar to those described above, with the addition of a fuel cell. Like FIGS. 1 and 2, FIG. 3 shows a preheater 14, catalytic reformer 20, condenser 22, a source of high pressure water 12, and sources of hydrogen carriers 16 and 18. The hydrogen separated by the condenser 22 is provided to a fuel cell 24, which converts hydrogen to electricity. A storage tank 26 can be used to store hydrogen that is produced in excess of what is used by the fuel cell 24. If desired, the hydrogen from the condenser 22 can be further purified. In this example, heat generated by the fuel cell is used to help heat the catalytic reformer 20, which increases the efficiency of the system, since less external energy is needed to heat the reformer 20 to a desired temperature.

Following are descriptions of two examples of hydrogen production using the present invention, including the product gas composition for each example. In a first example, hydrogen is produced from natural gas using a system such as the system shown in FIG. 1. In this example, natural gas is injected into the preheater 14, along with high-pressure water. In one example, the natural gas and water are at a pressure in the range of 2000 to 12,000 psi. The preheater 14 heats the mixture, which flows into the catalytic reformer 20. In the reformer 20, the mixture is maintained at 375°-640° C. and 2000 to 12,000 psi). In the reformer 20, the mixture reacts with a catalyst to produce product gases, which are at least partially separated by the condenser 22. The resulting gases include hydrogen, carbon dioxide, methane, ethane, and propane.

FIG. 4 is a table presenting compositional data on four different product gas samples collected during a series of tests utilizing natural gas/methane as the hydrogen carrier. Each of these tests employed an approximate 4:1 water-to-methane molar ratio and a reformer temperature and pressure of about 440° C. and 3500 psi, respectively. The first column of data in FIG. 4 is for a sample of data collected from a continuous-process test in which residence time in the reformer was about 2 seconds. The three remaining data sets are for tests in which reformer residence time was increased by operating the reactor system in batch mode, with the objective of investigating the effect of residence time on product gas composition. Estimated residence times for Batch 1-3 tests were about 3, 10, and 15 minutes, respectively. The batch test results indicate that (under the conditions evaluated) residence time has no significant effect on product gas composition. Of primary interest in the natural gas results is the consistent absence of carbon monoxide in the product gas. With the gas chromatography-based analytical procedure employed for product gas characterization, the detection limit for carbon monoxide is about 100 parts per million (ppm), which means that if carbon monoxide is present in the product gas, it is present at a concentration of below 100 ppm. Carbon monoxide is one of two contaminants of major concern regarding hydrogen for PEM fuel cell applications (the other being sulfur species), which means that its absence from the product gas stream represents a significant process advantage over prior art technologies.

FIG. 5 presents compositional data on four different product gas samples collected during a series of tests utilizing methanol as a hydrogen carrier. Each of these tests employed an approximate 1:1 water-to-methanol molar ratio and a reformer temperature and pressure of about 380° C. and 3,200 psi, respectively. The first two data columns are for samples collected from continuous-process tests in which residence time in the reformer was about 2 seconds. The two remaining data sets are for tests in which reformer residence time was increased by operating the reactor system in batch mode, with the objective of investigating the effect of residence time on product gas composition. Estimated residence times for the Batch 1 and 2 tests were about 3 to 5 minutes. The batch test results indicate that (under the conditions evaluated) residence time has a measurable effect on product gas composition, most significantly on level of hydrogen and carbon dioxide.

The present invention described above can take on many forms, and include various alternatives. For example, various types and combinations of hydrogen feedstocks can be used. Suitable feedstocks may include hydrocarbon, oxygen-containing hydrocarbons or nitrogen-containing hydrocarbons. Examples of feedstocks that can be used with the present invention include, but are not limited to, methane, natural gas, methanol, ethanol, propane, butane, naphtha, ammonia, natural gas condensate liquids or natural gasoline, and other liquid or gaseous materials. Other feedstock examples include military-specification turbine fuel, commercial turbine fuel, diesel fuel, or kerosene.

Examples of catalysts that may be used with the present invention include Nickel and/or Nickel oxide with or without Copper on carrier/support. In another example, the catalyst may be Nickel oxide with or without lanthanum oxide, with or without potassium oxide, on carrier/support. In another example, the catalyst may be platinum, rhodium, cobalt, palladium and/or ruthenium alone or in combinations on carrier/support. One example of a suitable catalyst is a Nickel-Nickel Oxide catalyst manufactured by Süd-Chemie Inc., referred to as No. FCR-HC29.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of producing high pressure hydrogen on-demand comprising:
    pressurizing a hydrogen feedstock to at least 2,000 psi;
    pressurizing water to at least 2,000 psi; and
    placing the pressurized hydrogen feedstock and pressurized water into a catalytic reformer, wherein the hydrogen feedstock and water are exposed to a catalyst in the reformer.

2. The method of claim 1, wherein the hydrogen feedstock is natural gas.

3. The method of claim 1, wherein the hydrogen feedstock is methanol.

4. The method of claim 1, wherein the hydrogen feedstock is methane.

5. The method of claim 1, wherein the hydrogen feedstock is ethanol.

6. The method of claim 1, wherein the hydrocarbon feedstock is propane.

7. The method of claim 1, wherein the hydrogen feedstock is butane.

8. The method of claim 1, wherein the hydrogen feedstock is naphtha or gasoline.

9. The method of claim 1, wherein the hydrogen feedstock is ammonia.

10. The method of claim 1, wherein the hydrogen feedstock is military-specification turbine fuel, commercial turbine fuel, diesel fuel, kerosene, or fuel oil.

11. The method of claim 1, wherein the hydrogen feedstock is natural gas condensate liquids or natural gasoline.

12. The method of claim 1, further comprising maintaining a pressure in the catalytic reformer to be greater than 3,200 psi.

13. The method of claim 1, further comprising maintaining a temperature in the catalytic reformer in the range of 375° to 640° Celsius.

14. The method of claim 1, further comprising: maintaining a pressure in the catalytic reformer in the range of 2,000 to 12,000 psi; and maintaining a temperature in the catalytic reformer in the range of 375° to 640° Celsius.

15. The method of claim 1, further comprising separating hydrogen from other reformer output gases.

16. The method of claim 15, wherein carbon dioxide and water are separated from hydrogen using a condenser.

17. The method of claim 1, wherein carbon dioxide is separated and recovered for sequestration or other utilization option.

18. The method of claim 1, further comprising using produced hydrogen to power a fuel cell.

19. The method of claim 13, wherein the feedstock is preheated to the temperature in the reformer.

* * * * *